US008612733B2

(12) United States Patent
Flippin (10) Patent No.: US 8,612,733 B2
(45) Date of Patent: Dec. 17, 2013

(54) BATTERY MANAGEMENT SYSTEMS WITH ENUMERATING CIRCUITS (75) Inventor: Allan Flippin, Brentwood, CA (US)

(73) Assignee: O2Micro, Inc., Santa Clara, CA (US)

( * ) Notice: Subject to any disclaimer, the term of this patent is extended or adjusted under 35 U.S.C. 154(b) by 366 days.

(21) Appl. No.: 13/184,405

(22) Filed: Jul. 15, 2011

(65) Prior Publication Data

US 2013/0019118 A1   Jan. 17, 2013

(51) Int. Cl.
*G06F 3/00* (2006.01)
*G06F 15/177* (2006.01)

(52) U.S. Cl.
USPC .................................................. 713/1; 710/9

(58) Field of Classification Search
USPC .................................................. 713/1; 710/9
See application file for complete search history.

(56) References Cited

U.S. PATENT DOCUMENTS 6,871,244 B1 *   3/2005   Cahill et al. ..................... 710/62
7,058,739 B2 *   6/2006   Wu ................................ 710/106

OTHER PUBLICATIONS

Datasheet of "LTC6803-1/LTC6803-3, Multicell Battery Stack Monitor", Linear Technology (40 pages).
Datasheet of "LTC6802-2/LTC6803-4, Multicell Battery Stack Monitor", Linear Technology (40 pages).
"SPI Block Guide", Motorola, Inc., Feb. 4, 2003, V03.06 (38 pages).
System Management Bus (SMBus) Specification, SBS Implementers Forum, Version 2.0, Aug. 3, 2000 (59 pages).

* cited by examiner

*Primary Examiner* — Mark Connolly (57) ABSTRACT

A system may include multiple chips and a host processor. The host processor can be coupled to the multiple chips and send an enumerate command. The multiple chips can propagate an enumerate packet including the enumerate command from chip-to-chip, and each chip can use information in the enumerate packet to determine its own unique address.

26 Claims, 9 Drawing Sheets

BATTERY MANAGEMENT SYSTEMS WITH ENUMERATING CIRCUITS

CROSS REFERENCE TO RELATED APPLICATION

This application is related to application Ser. No. 13/184,384, entitled "Battery Management Systems with Vertical Bus Circuits," by A. Flippin et al., filed concurrently herewith.

BACKGROUND

Conventional battery management systems include multiple battery management chips and a host processor coupled to the battery management chips. The multiple battery management chips can be coupled to multiple battery modules to monitor the statuses of the battery modules. The host processor can be used to communicate with the battery management chips. The host processor acquires the addresses of the battery management chips before accessing the battery management chips. A conventional battery management chip requires extra pins, e.g. three pins, to indicate its address. However, the extra pins increase the die size and the printed circuit board (PCB) area of the battery management chip; thus, the cost of the battery management chip increases accordingly.

Moreover, in some applications, the host processor sends a broadcast command to instruct all the battery management chips to execute the command at the same time. However, due to communication delay, it is impossible for all the battery management chips to execute the broadcast command simultaneously.

SUMMARY

In one embodiment, a system includes multiple chips and a host processor. The host processor is coupled to the multiple chips and sends an enumerate command. The multiple chips propagate an enumerate packet including the enumerate command from chip-to-chip, and each chip uses information in the enumerate packet to determine its own unique address.

In another embodiment, a battery management chip includes a battery management unit and an enumerating circuit. The battery management unit monitors and samples statuses of cells in a battery module coupled to the battery management chip. The enumerating circuit is coupled to the battery management unit and receives an enumerate packet. The enumerate packet includes an enumerate command and a first number. The enumerating circuit generates a second number based on the first number in response to the enumerate command.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "sending," "detecting," "converting," "comparing," "determining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
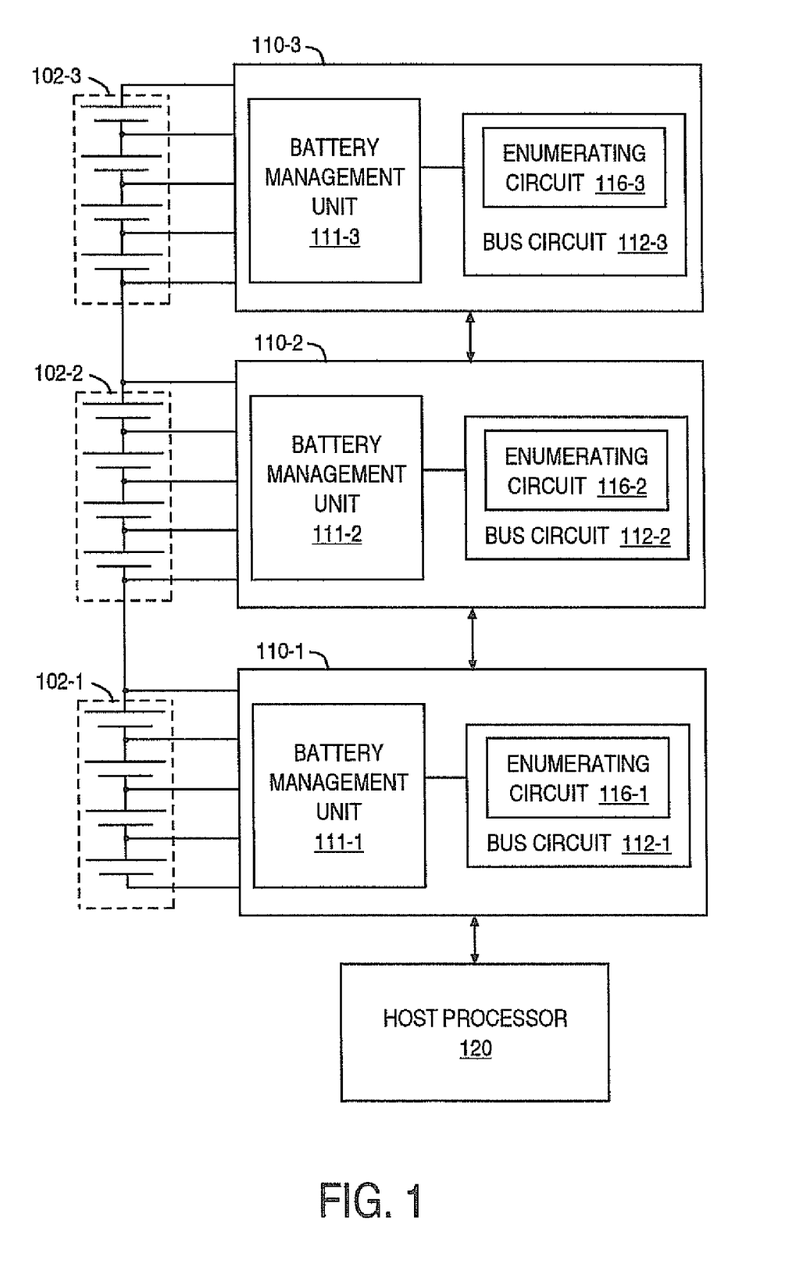
FIG. 1 shows a block diagram of an example of a battery management system with enumerating circuits, in accordance with one embodiment of the present invention.

FIG. 1 shows a block diagram of an example of a battery management system 100 with enumerating circuits, in accordance with one embodiment of the present invention. In one embodiment, the battery management system 100 includes multiple battery modules 102-$i$, e.g., 102-1, 102-2 and 102-3, coupled in series, battery management chips 110-$i$, e.g., 110-1, 110-2 and 110-3, coupled to the battery modules 102-1, 102-2 and 102-3, respectively, and a host processor 120 coupled to the battery management chip 110-1. Since the embodiment shown in FIG. 1 is only for illustrative purposes, the number of the battery management chips can be any number depending on the requirements of the particular application in which they are used.

A battery module 102-$i$ further includes one or more battery cells, e.g., four battery cells as shown in the example of FIG. 1. The battery management chips 110-1, 110-2 and 110-3 are coupled to each other in series via a bus. Each battery management chip 110-$i$ includes a corresponding battery management unit 111-$i$ and a corresponding bus circuit 112-$i$. The battery management unit 111-$i$ can monitor and sample the status (e.g., cell voltage) of each battery cell in the corresponding battery module 102-$i$ according to an instruction received from the host processor 120. The bus circuit 112-$i$ includes an enumerating circuit 116-$i$ and transfers signals between the battery management unit 111-$i$ and the host processor 120.

In one embodiment, the host processor 120 sends an enumerate command to the battery management chips to allow each of the battery management chips to determine its own address. In one embodiment, a unique chip number is assigned to each battery management chip 110-$i$ to represent the address of the battery management chip 110-$i$. In one such embodiment, the host processor 120 sends an enumerate packet including the enumerate command and an initial chip number. Upon receiving the enumerate packet, the enumerating circuit 116-$i$ in the bus circuit 112-$i$ can generate a new chip number based on the chip number in the received enumerate packet, e.g., by increasing the received chip number by one to generate the new chip number. In one embodiment, the generated new chip number can be used to represent the address of the battery management chip 110-$i$. In another embodiment, the received chip number can be used to represent the address of the battery management chip 110-$i$, and the generated new chip number can be used to represent the address of an upward battery management chip 110-($i$+1). In one such embodiment, as shown in the example of FIG. 1, the battery management chip 110-3 is the top chip. Therefore, the enumerating circuit 116-3 in the top battery management chip 110-3 does not generate a new chip number.

In one embodiment, the enumerate packet further includes checking data, and the enumerating circuit 116-$i$ checks the received chip number in accordance with the checking data, e.g., by comparing the checking data with the received chip number. If there is an error in the received chip number, the battery management chip 110-$i$ can disregard the received enumerate packet, and the host processor 120 can then resend a new enumerate packet to determine the address of that battery management chip 110-$i$.

Advantageously, by using a unique chip number to represent the address of each battery management chip 110-$i$, pins that are conventionally used to indicate the address of the battery management chip 110-$i$ are eliminated. Consequently, the number of the pins for the battery management chip 110-$i$ is decreased. As such, the die size and the printed circuit board (PCB) area of the battery management chip decrease, and the cost of the battery management chip decreases accordingly.

Figure 2:
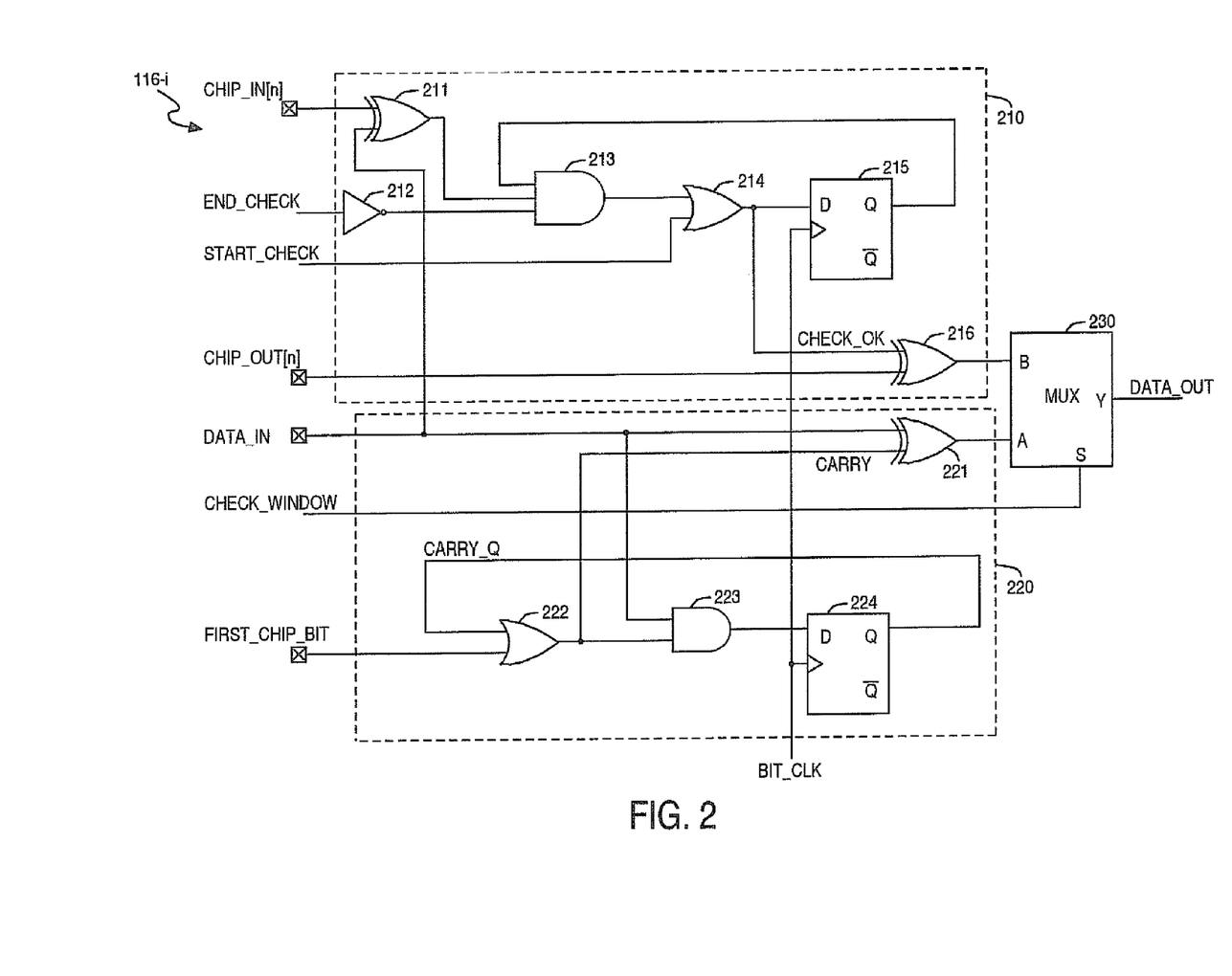
FIG. 2 shows a block diagram of an example of an enumerating circuit, in accordance with one embodiment of the present invention.

FIG. 2 shows a block diagram of an example of an enumerating circuit 116-$i$ in FIG. 1, in accordance with one embodiment of the present invention. The enumerating circuit 116-$i$ includes a checking circuit 210, a chip number generator 220, and a multiplexer (MUX) 230. The chip number generator 220 includes a first terminal DATA_IN to receive an enumerate packet, and a second terminal to receive a signal FIRST_CHIP_BIT. In one embodiment, the signal FIRST_CHIP_BIT is high when the first bit of the chip number in the enumerate packet is received at the terminal DATA_IN. The chip number generator 220 receives the chip number in the enumerate packet and outputs a new chip number to the multiplexer 230, e.g., by increasing the received chip number by one. In the example of FIG. 2, the chip number generator 220 includes an XOR gate 221, an OR gate 222, an AND gate 223, and a flip-flop 224.

The checking circuit 210 includes a terminal CHIP_IN[n] to receive the chip number in the enumerate packet and a terminal CHIP_OUT[n] to receive the new chip number generated by the chip number generator 220. In one embodiment, the checking circuit 210 further receives checking data in the enumerate packet via the terminal DATA_IN in a checking process. After the chip number generator 220 generates the new chip number, a signal START_CHECK received by the checking circuit 210 is high. Then, the checking circuit 210 compares the checking data received at the terminal DATA_IN with the chip number received at the terminal CHIP_IN[n], and generates a signal CHECK_OK to indicate if an error has occurred in the received chip number. Moreover, the checking circuit 210 can generate new checking data for the MUX 230; the new checking data is used to check for an error in the new chip number generated by the chip number generator 220. In one embodiment, the checking data is an inversion of the chip number received by the enumerating circuit 116-$i$. In the example of FIG. 2, the checking circuit 210 includes XOR gates 211 and 216, an inverter 212, an AND gate 213, an OR gate 214, and a flip-flop 215.

The MUX 230 receives the new chip number generated by the chip number generator 220 and the new checking data generated by the checking circuit 210. More specifically, the first input terminal A of the MUX 230 is coupled to the chip number generator 220, and the second input terminal B of the MUX 230 is coupled to checking circuit 210. A select terminal S of the MUX 230 receives a signal CHECKING_WINDOW for selecting between a generating process and the checking process. During the generating process, the MUX 230 provides the new chip number generated by the chip number generator 220. During the checking process, the MUX 230 provides the new checking data generated by the checking circuit 210.

Figure 3:
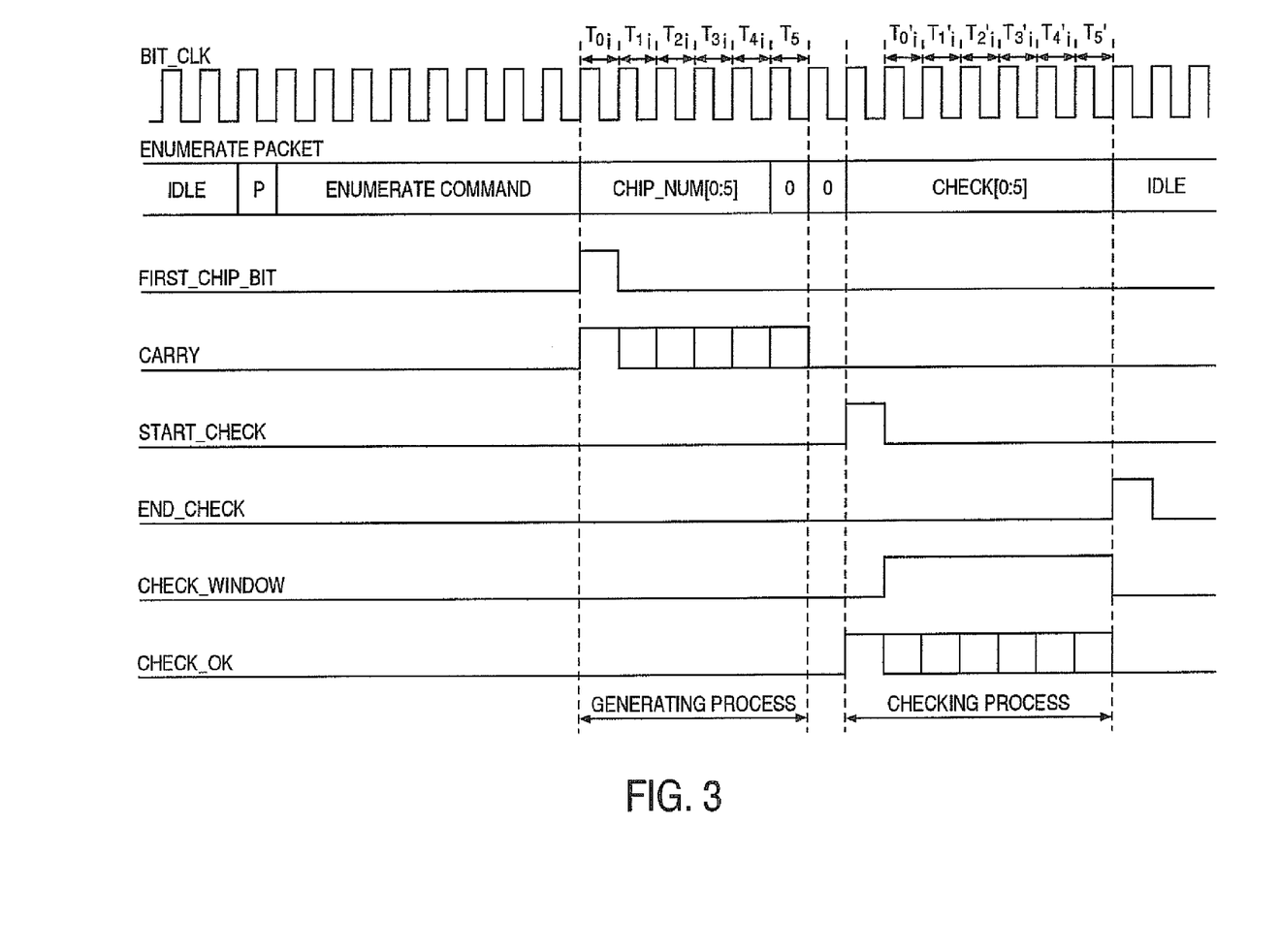
FIG. 3 shows a timing diagram of signals associated with an enumerating circuit, in accordance with one embodiment of the present invention.

FIG. 3 shows a timing diagram of signals associated with the enumerating circuit 116-$i$ in FIG. 2, in accordance with one embodiment of the present invention. FIG. 3 is described in combination with FIG. 2. An enumerate packet is received at the terminal DATA_IN. In the example of FIG. 3, the enumerate packet includes several idle bits, a preamble P, an enumerate command, a chip number (e.g., CHIP_NUM[0:5], where CHIP_NUM[0] is the least significant bit and CHIP_NUM[5] is the most significant bit), and checking data (e.g., CHECK[0:5], where CHECK[0] is the least significant bit and CHECK[5] is the most significant bit). In one embodiment, the enumerate command is sent by the host processor 120 to determine the total number of the battery management chips coupled to the host processor 120 and to allow each battery management chip to determine its own address. In one embodiment, the checking data CHECK[0:5] is an inversion of the chip number CHIP_NUM[0:5].

In one embodiment, the chip number, e.g., CHIP_NUM[0:5], is received after the enumerate command. When the first bit of the chip number CHIP_NUM[0] is received at the terminal DATA_IN, the signal FIRST_CHIP_BIT goes high, which indicates that the generating process has started. Thus, the output signal CARRY of the OR gate 222 goes high during cycle (time period) $T_0$. The signal CARRY during a cycle $T_{n+1}$ (e.g., n=0, 1, 2, 3 and 4) depends on the corresponding input bit CHIP_NUM[n]. For example, if the input bit CHIP_NUM[n] is digital one, the signal CARRY is high during the next cycle $T_{n+1}$ of the clock BIT_CLK. However, if the input bit CHIP_NUM[n] is digital zero, the signal CARRY remains low during the next cycles $T_{n+1}$ to $T_5$ regardless of whether the input bits CHIP_NUM[n+1:5] are digital zero or one. Therefore, by using the XOR gate 221, the chip number generator 220 generates a new chip number that is, e.g., equal to the received chip number CHIP_NUM[0:5] increased by one. For example, if the chip number CHIP_NUM[0:5] is 110010 during $T_0$-$T_5$, the signal CARRY is 111000 during $T_0$-$T_5$, and the chip number generator 220 generates a new chip number CHIP_NUM'[0:5] 001010 (CHIP_NUM'[0] is the least significant bit and CHIP_NUM'[5] is the most significant bit). (On the vertical bus, the least significant bit is transferred first, CHIP_NUM [0] is the least significant bit, and CHIP_NUM [5] is the most significant number. If CHIP_NUM [0:5] is 110010, the newly generated number CHIP_NUM'[0:5] is 001010, that means the actually chip number is 010011, and the newly generated chip number is 010100, which is 010011 increased by one.) During the generating process, the signal CHECK_WINDOW received at the select terminal S of the MUX 230 goes low. As a result, the output DATA_OUT of the MUX 230 is the output of the chip number generator 220.

When the signal START_CHECK goes high, the checking process begins. As a result, the output signal CHECK_OK of the OR gate 214 goes high. The signal START_CHECK goes low during the next cycle $T_0'$ of the clock BIT_CLK. Thus, the signal CHECK_OK is determined by the output of the AND gate 213. The checking data CHECK [0:5] is received at the input terminal DATA_IN during $T_0'$ to $T_5'$. The signal END_CHECK remains low until the checking process is completed. As a result, the output of the inverter 212 remains high. The checking data CHECK [0:5] is the inversion of the chip number CHIP_NUM[0:5], in one embodiment. As a result, the signal CHECK_OK remains high during $T_0'$-$T_5'$, indicating no error has occurred in the chip number CHIP_NUM [0:5]. Meanwhile, the input terminal CHIP_OUT[n] receives the new chip number CHIP_NUM'[0:5] generated by the chip number generator 220. If there is no error in the chip number CHIP_NUM[n], the signal CHECK_OK remains high during $T_n'$, and the XOR gate 216 generates a new checking data bit which is the inversion of data bit received at the terminal CHIP_OUT[n]. Consequently, new checking data is generated, which is an inversion of the new chip number generated by the chip number generator 220. During $T_0'$ to $T_5'$ of the checking process, the signal CHECK_WINDOW received at the select terminal S of the MUX 230 remains high. As a result, the output DATA_OUT of the MUX 230 is the output of the checking circuit 210. After cycle $T_5'$, the signal CHECK_WINDOW goes low again, indicating the checking process has been completed.

In one embodiment, the bus circuit 112-$i$ then sends a new enumerate packet which includes the enumerate command, the new chip number and the new corresponding checking data to the upward bus circuit 112-($i$+1) in the corresponding battery management chip 110-($i$+1). In one embodiment, if the battery management chip 110-$i$ is the top battery management chip, the battery management chip 110-$i$ sends a reply to the battery management chip 110-($i$−1), which can also be sent to the host processor 120. The reply can include the enumerate command and the chip number of the battery management chip 110-$i$, and the host processor 120 can determine the total number of battery management chips in the battery management system in accordance with the chip number in the reply. If, however, the bus circuit 112-$i$ detects that the signal CHECK_OK is low at any time during T0'-T5', the checking circuit 210 generates checking data which is not an inversion of the new chip number generated by the chip number generator 220. Then the upper battery management 110-($i$+1) can detect that an error has occurred in the chip number or the checking data, and can disregard the enumerate packet, such that the host processor 120 can resend a new enumerate command to determine the total number of the battery management chips coupled to the host processor 120 and allow each battery management chip to determine its own address.

Figure 4:
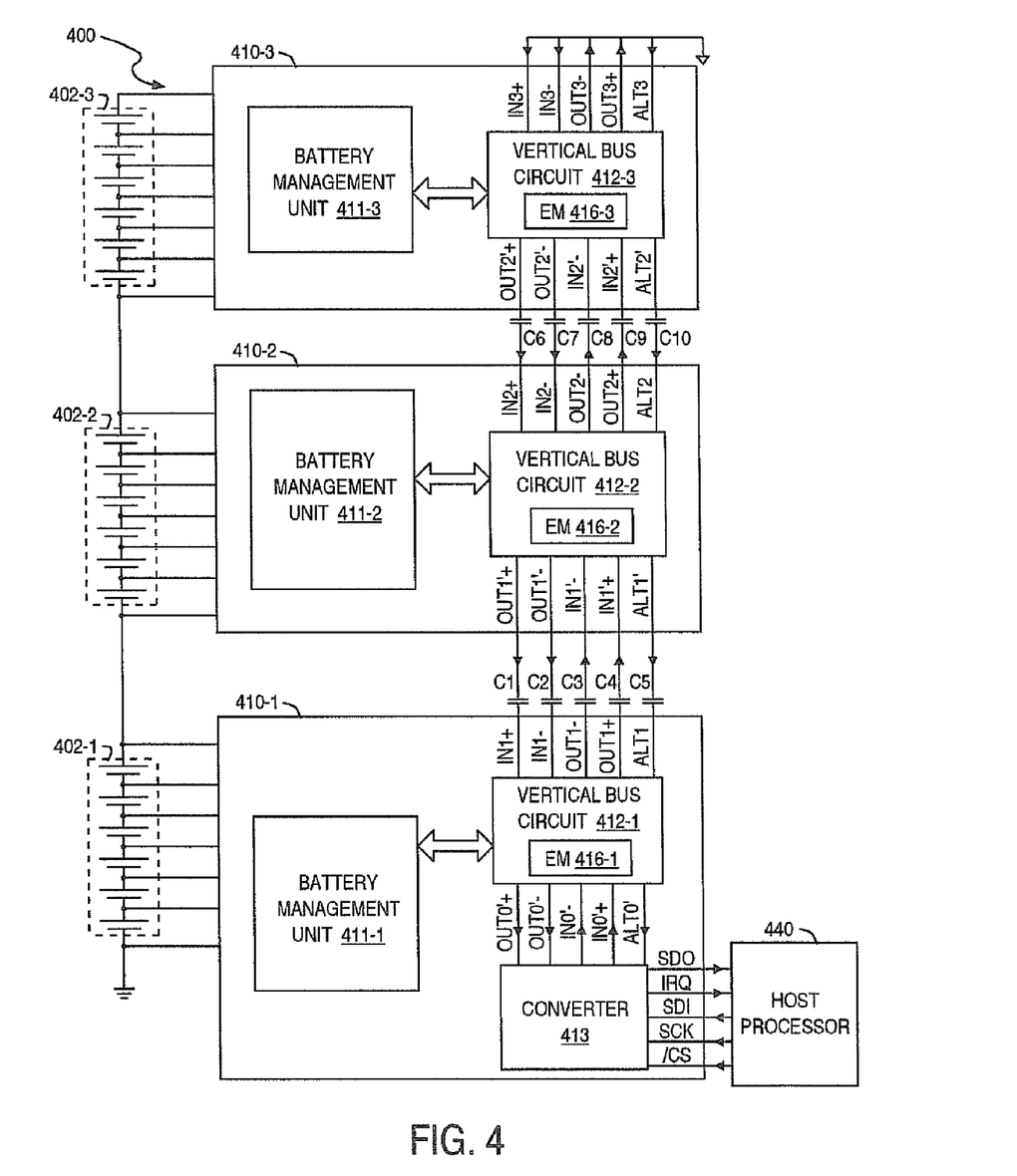
FIG. 4 shows a block diagram of an example of a battery management system with enumerating circuits, in accordance with one embodiment of the present invention.

FIG. 4 shows a block diagram of an example of a battery management system 400 with enumerating circuits in FIG. 2, in accordance with one embodiment of the present invention. In one embodiment, the battery management system 400 includes battery modules 402-$i$, e.g., 402-1, 402-2 and 402-3, coupled in series, battery management chips 410-$i$, e.g., 410-1, 410-2 and 410-3, coupled to the battery modules 402-1, 402-2 and 402-3, respectively, and a host processor 440 coupled to the battery management chip 410-1. Since the embodiment shown in FIG. 4 is only for illustrative purposes, the number of the battery management chips can be any number depending on the requirements of the particular application.

A battery module 402-*i* further includes one or more battery cells, e.g., six battery cells as shown in the example of FIG. 4. The battery management chips 410-1, 410-2 and 410-3 are coupled to each other via one or more galvanic isolators. In one embodiment, the galvanic isolators are passive isolators so that no additional power supply is needed to power the galvanic isolators. For example, multiple capacitors C1-C10 can be used in the battery management system 400 to galvanically isolate the battery management chips 410-1-410-3. As shown in the example of FIG. 4, battery management chip 410-3 is coupled to the battery management chip 410-2 via capacitors C6-C10, and battery management chip 410-2 is coupled to the battery management chip 410-1 via capacitors C1-C5. In another embodiment, multiple transformers or inductors can also be used in the battery management system 400 to galvanically isolate the battery management chips 410-1-410-3. By using the galvanic isolators between the adjacent battery management chips, the battery management chips are galvanically isolated and can be protected from damage if a connection break occurs between adjacent battery modules. Moreover, the cost of the battery management system is reduced by using the passive galvanic isolators.

In one embodiment, each battery management chip 410-*i* includes a corresponding battery management unit 411-*i* and a corresponding vertical bus circuit 412-*i*. The battery management unit 411-*i* can monitor and sample the status (e.g., cell voltage) of each battery cell in the corresponding battery module 402-*i* according to an instruction received from the host processor 440. The vertical bus circuit 412-*i* transfers signals between the battery management unit 411-*i* and the host processor 440. In one embodiment, the vertical bus circuit 412-*i* further includes an enumerating circuit 416-*i*. The configurations and the operations of the enumerating circuit 416-*i* as shown in FIG. 4 are similar to the enumerating circuit 116-*i* in FIG. 2; hence, repetitive descriptions are omitted herein for purposes of brevity and clarity.

In one embodiment, the vertical bus circuit 412-*i* receives a first pair of differential input data signals (e.g., positive differential signal INPUT+ and negative differential signal INPUT−) via pins IN(i−1)'+ and IN(i−1)'− from the lower battery management chip 410-(*i*−1), and outputs a first pair of differential output data signals (e.g., a positive differential signal OUTPUT+ and a negative differential signal OUTPUT−) via pins OUTi+ and OUTi−, respectively, to the upper battery management chip 410-(*i*+1). The vertical bus circuit 412-*i* further receives a second pair of differential input data signals via pins INi+ and INi− from the upper battery management chip 410-(*i*+1) and outputs a second pair of differential output data signals via pins OUT(i−1)'+ and OUT(i−1)'− to the lower battery management chip 410-(*i*−1). In one embodiment, the pins IN3+, IN3−, OUT3+ and OUT3− of the battery management chip 410-3 are coupled to the ground, indicating that the battery management chip 410-3 is the top chip. As such, the battery management chip 410-3 does not receive the second pair of differential input data signals via pins IN3+ and IN3; however, the battery management chip 410-3 can output the second pair of differential output data signals via pins OUT2'+ and OUT2'− to the lower battery management chip 410-2. In one embodiment, the vertical bus circuit 412-1 in the bottom battery management circuit 410-1 receives the first pair of differential input data signals via pins IN0'+ and IN0'− from a converter 413 and outputs the first pair of differential output data signals via pins OUT1+ and OUT1− to the upper battery management chip 410-2. The vertical bus circuit 412-1 further receives the second pair of differential input data signals via pins IN1+ and IN1− from battery management chip 410-2 and outputs the second pair of differential output data signals via pins OUT0'+ and OUT0'− to the converter 413. The vertical bus circuit 412-*i* can further provide an alert signal via a pin ALT(i−1)' to inform the host processor 440 of the status of the corresponding battery management chip 410-*i* (for example, whether self-testing of the battery management chip 410-*i* is completed) and to request service from the host processor 440. The alert signal is sent to the lower battery management chip 410-(*i*−1) and is further transferred to the host processor 440.

Advantageously, by using the differential input/output data signals, noise on the vertical bus is reduced or eliminated. Moreover, in one embodiment, in case of an abnormal condition (e.g., an open circuit or a short circuit) on any bus that is transferring differential data signals, communication can continue by using a single wire of the other differential signal pair. In another embodiment, if an abnormal condition occurs as just described, communication can continue by using the other pair of wires to transmit the differential input/output data signals. Thus, the wire transferring the differential input/output data signals can operate in a bidirectional mode.

In one embodiment, the converter 413 is coupled to the host processor 440 and the vertical bus circuit 412-1 as shown in the example of FIG. 4. The converter 413 communicates with the host processor 440 using a first type of protocol, e.g., the Serial Peripheral Interface (SPI) bus protocol. The signals transferred between the converter 413 and the host processor 440 include an output data signal transferred from the converter 413 to the host processor 440 via a pin SDO, a request signal transferred from the converter 413 to the host processor 440 via a pin IRQ, an input data signal transferred from the host processor 440 to the converter 413 via a pin SDI, and a clock signal and an enable signal transferred from the host processor 440 to the converter 413 via a pin SCK and a pin/CS, respectively. In one embodiment, the converter 413 communicates with the vertical bus circuit 412-1 using a second type of protocol, e.g., a vertical bus protocol, and the battery management chip 410-*i* communicates with the adjacent battery management chips 410-(*i*+1) and 410-(*i*−1) using the second type of protocol, e.g., vertical bus protocol. The converter 413 is able to convert the data communicated using the first type of protocol and received from the host processor 440 via the pin SDI into a pair of differential data signals that can be communicated using the second type of protocol and can be transferred to the vertical bus circuit 412-1 via pins IN0'− and IN0'+. Similarly, the converter 413 is also able to convert the pair of differential data signals that are communicated with the second type of protocol and that are received from the vertical bus 412-1 via pins OUT0'− and OUT0'+ into data that can be communicated with the first type of protocol and that can be transferred to the host processor 440 via the pin SDO. In the example of FIG. 4, the converter 413 is integrated in the battery management chip 410-1. However, the converter 413 can be also located outside the battery management chip 410-1.

In operation, the host processor 440 sends an enumerate command via the pin SDI to the battery management chip 410-1 to determine the total number of the battery management chips coupled to the host processor 440 and to allow each battery management chip 410-*i* to determine its own address. In one embodiment, each battery management chip 410-*i* is assigned with a unique chip number to represent the address of the corresponding battery management chip. For example, upon receiving the enumerate command from the host processor 440, the converter 413 generates an initialized chip number, e.g., 000000. The converter 413 can also generate checking data for enumeration error checking purposes, e.g., the checking data is an inversion of the initialized chip number, e.g., 111111. In one embodiment, the converter 413 sends an enumerate packet which includes the enumerate command, the initialized chip number and the checking data to the vertical bus circuit 412-1 in the battery management chip 410-1. The enumerate packet sent by the converter 413 conforms to the vertical bus protocol.

Upon receiving the enumerate packet from the converter 413, the vertical bus circuit 412-1 can store the initialized chip number from the enumerate packet into a register of the vertical bus circuit 412-1. The enumerating circuit 416-1 in the vertical bus circuit 412-1 further generates a new chip number (e.g., 000001), for example, by increasing the initialized chip number in the received enumerate packet, generates corresponding checking data (e.g., 111110), e.g., an inversion of the new chip number, and sends an enumerate packet including the enumerate command, the new chip number and corresponding checking data to the vertical bus circuit 412-2 in the battery management chip 410-2, in one embodiment. The operations of the vertical bus circuits 412-2 and 412-3 are the same as the operation of the vertical bus circuit 412-1; hence, repetitive descriptions are omitted herein for purposes of brevity and clarity.

In one embodiment, a chip number received by a vertical bus circuit 412-$i$ in a corresponding battery management chip 410-$i$ is used to represent the address of the battery management chip 410-$i$. In one such embodiment, as shown in the example of FIG. 4, the pins IN3+, IN3−, OUT3+, OUT3− and ALT3 of the vertical bus circuit 412-3 in the battery management chip 410-3 are coupled to the ground, indicating that the battery management chip 410-3 is the top chip. Therefore, the vertical bus circuit 412-3 in the top battery management chip 410-3 does not generate a new chip number. However, in another embodiment, a chip number generated by the vertical bus circuit 412-$i$ can be used to represent the address of the battery management chip 410-$i$, and thus the vertical bus circuit 412-3 in the top battery management chip 410-3 generates a new chip number to represent the address of the battery management chip 410-3.

In one embodiment, after the top battery management chip 410-3 receives the enumerate packet (and generates a new chip number if the new chip number is used to represent the address of the battery management chip 410-$i$), the top battery management chip 410-3 sends a reply to the other battery management chips 410-1 and 410-2, and also to the host processor 440. The reply includes the enumerate command and the chip number of the top battery management chip (e.g., battery management chip 410-3 as shown in the example of FIG. 4), in one embodiment. After the host processor 440 receives the reply, it can determine the total number of battery management chips coupled to the host processor 440, e.g., according to the chip number of the top battery management chip.

Figure 5A:
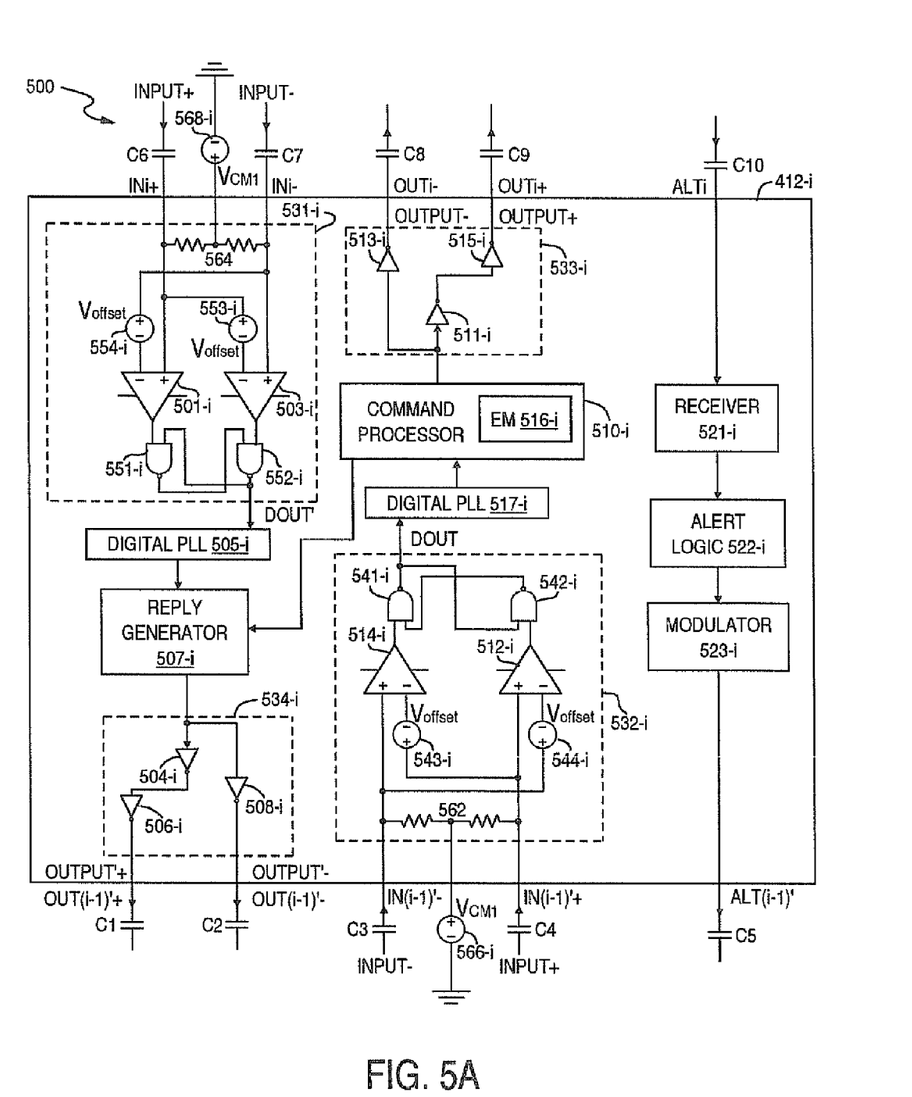
FIG. 5A shows a block diagram of an example of a vertical bus circuit in a battery management chip, in accordance with one embodiment of the present invention.

FIG. 5A shows a block diagram of an example of a vertical bus circuit 412-$i$ in the battery management chip 410-$i$ in FIG. 4, in accordance with one embodiment of the present invention. FIG. 5A is described in combination with FIG. 4.

In one embodiment, the vertical bus circuit 412-$i$ includes a downward data path, an upward data path, and an alert data path. The upward data path includes a receiver 532-$i$, a digital phase-locked loop (PLL) 517-$i$, a command processor 510-$i$, and a transmitter 533-$i$. The command processor 510-$i$ can further include the enumerating circuit 516-$i$. The downward data path includes a receiver 531-$i$, a digital phase-locked loop (PLL) 505-$i$, a reply generator 507-$i$, and a transmitter 534-$i$. The alert data path includes a receiver 521-$i$, an alert logic 522-$i$, and a modulator 523-$i$.

The receiver 532-$i$ includes a pair of comparators 512-$i$ and 514-$i$ for receiving a first pair of differential input data signals INPUT+ and INPUT− via pins IN(i−1)'+ and IN(i−1)'−. For example, the pin IN(i−1)'+ receives the positive differential signal INPUT+ of the differential signals and the pin IN(i−1)'− receives the negative differential signal INPUT− of the differential signals. A common mode voltage $V_{CM1}$ is provided at the node 562 by a voltage source 566-$i$, to provide a steady-state voltage for signals IN+ and IN− (not shown in the example of FIG. 5A) received by the receiver 532-$i$ via the capacitors C4 and C3, respectively.

In one embodiment, an offset voltage $V_{offset}$ is provided to define a hysteresis area for an output signal DOUT of the receiver 532-$i$, and further for noise rejection and high frequency signal rejection. As shown in the example of FIG. 5A, the non-inverting terminal of the comparator 512-$i$ is coupled to the inverting terminal of the comparator 514-$i$ through an embedded offset voltage generator, e.g., a voltage source 543-$i$. The non-inverting terminal of the comparator 514-$i$ is coupled to the inverting terminal of the comparator 512-$i$ through an embedded offset voltage generator, e.g., a voltage source 544-$i$ as shown in the example of FIG. 5A. The voltage across each of the voltage sources 543-$i$ and 544-$i$ is equal to $V_{offset}$. As shown in the example of FIG. 5A, the negative terminal of the voltage source 544-$i$ is coupled to the inverting terminal of the comparator 512-$i$, and the negative terminal of the voltage source 543-$i$ is coupled to the inverting terminal of the comparator 514-$i$. In another embodiment, the positive terminal of the voltage source 544-$i$ can also be coupled to the non-inverting terminal of the comparator 512-$i$. The positive terminal of the voltage source can be coupled to the non-inverting terminal of the comparator 514-$i$.

In one embodiment, the embedded offset voltage generator can be implemented by a voltage source as shown in the example of FIG. 5A. In another embodiment, the embedded offset voltage generator can instead be implemented by a resistor with a current flowing through the resistor.

As shown in the example of FIG. 5A, each of the comparators 512-$i$ and 514-$i$ is coupled to an NAND gate. For example, the output of the comparator 512-$i$ is coupled to the NAND gate 542-$i$ and the output of the comparator 514-$i$ is coupled to the NAND gate 541-$i$. The output of the NAND 541-$i$ is coupled to the digital PLL 517-$i$ to provide the data signal DOUT indicative of the positive differential data signal INPUT+ received at the pin IN(i−1)'+ to the digital PLL 517-$i$ for synchronization. In another embodiment, the output of the NAND 542-$i$ can be coupled to the digital PLL 517-$i$ to provide the output data signal indicative of the negative differential data signal INPUT− received at the pin IN(i−1)'− to the digital PLL 517-$i$. In one embodiment, comparators 512-$i$ and 514-$i$ can be integrated into a differential input comparator.

In one embodiment, as shown in the example of FIG. 5A, the comparators 512-$i$ and 514-$i$, the offset voltage generators 544-$i$ and 543-$i$, and the NAND gates 541-$i$ and 542-$i$ can be implemented as a hysteresis unit for the output signal DOUT of the receiver 532-$i$. If the difference between the signals IN+ and IN− is greater than the offset voltage $V_{offset}$, the output signal DOUT can be logic low or logic high. More specifically, the output signal DOUT can be logic high as given by equation (1):

$$V_{IN+} - V_{IN-} > V_{offset} \quad (1)$$

The output signal DOUT can be logic low as given by equation (2):

$$V_{IN+} - V_{IN-} < -V_{offset} \quad (2)$$

If the difference between the signals IN+ and IN− is less than the offset voltage $V_{offset}$, as shown in equation (3), the output signal DOUT maintains its previous status and is unchanged.

$$|V_{IN+} - V_{IN-}| < V_{offset} \quad (3)$$

Figure 5B:
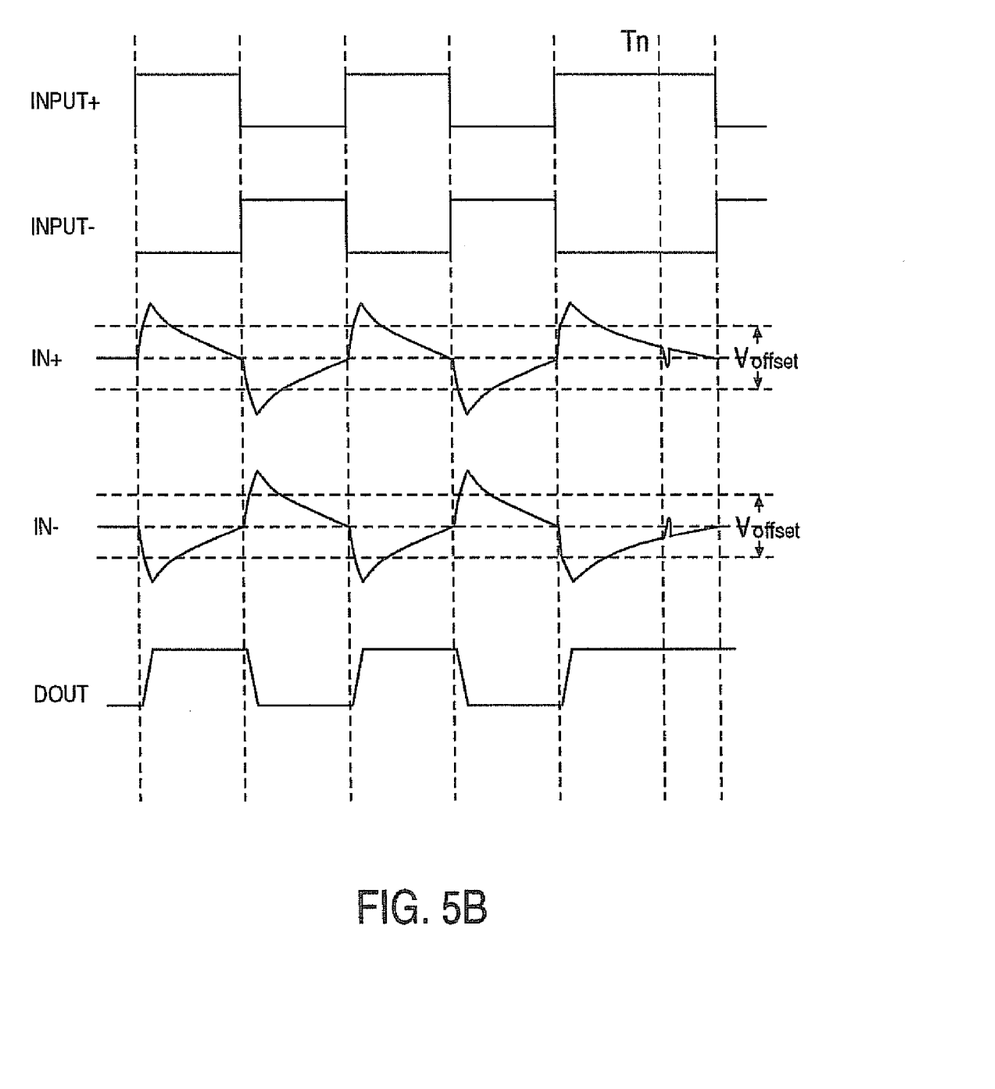
FIG. 5B shows an example of signals associated with a receiver in a vertical bus circuit, in accordance with one embodiment of the present invention.

FIG. 5B shows an example of signals associated with the receiver 532-$i$ in the vertical bus circuit 412-$i$ as shown in FIG. 5A. Signals INPUT+ and INPUT− represent the differential input data signals sent to the capacitors C4 and C3, respectively, from the lower battery management chip 410-($i$−1). In another embodiment, signals INPUT+ and INPUT− represent the differential input data signals from the converter 413 if the battery management chip is the bottom battery management chip 410-1. Signals IN+ and IN− are signals that are received by the receiver 532-$i$ via capacitors C4 and C3 respectively. Signal DOUT is output by the NAND gate 541-$i$, and it represents the output of the receiver 532-$i$. In one embodiment, DOUT is indicative of the positive differential data signal INPUT+ received by the capacitor C4. As shown in the example of FIG. 5B, if there is noise at the pins IN($i$−1)'+ and IN($i$−1)'− at time Tn, then that noise can be canceled out in the signal DOUT if the difference of the differential signals IN+ and IN− is within the hysteresis area which is defined by the offset voltage $V_{offset}$.

Referring back to FIG. 5A, the digital PLL 517-$i$ synchronizes the received data signal with the clock in the battery management chip 410-$i$ and sends the synchronized data to the command processor 510-$i$. The command processor 510-$i$ can process the synchronized data. In one embodiment, when the synchronized data indicates an instruction from the host processor 440, e.g., an instruction for a battery management chip 410-$i$ to sample the cell voltages of a corresponding battery module 402-$i$, the command processor 510-$i$ can compare the address in the synchronized data with the address of the corresponding battery management chip 410-$i$. In one embodiment, the address can be a unique chip number assigned to each battery management chip during the enumeration process. If the addresses match, the command processor 510-$i$ sends the data to the reply generator 507-$i$. In such one embodiment, the reply generator 507-$i$ instructs the battery management chip 410-$i$ to implement the instruction, e.g., instructs the battery management unit 411-$i$ to sample the cell voltages of the corresponding battery module 402-$i$, and generates a reply to the host processor 440. If the addresses do not match, the command processor 510-$i$ sends the synchronized data to the transmitter 533-$i$. The transmitter 533-$i$ includes multiple inverters 511-$i$, 513-$i$ and 515-$i$ as shown in the example of FIG. 5A. The inverters 511-$i$ and 515-$i$ can drive and output a positive differential signal, and the inverter 513-$i$ can drive and output a negative differential signal. As such, the transmitter 533-$i$ outputs a pair of differential output data signals indicative of the synchronized data via the pins OUTi+ and OUTi− to the vertical bus circuit 412-($i$+1) in the battery management chip 410-($i$+1).

The elements and configurations in the receiver 531-$i$ in the downward data path are the same as shown in the receiver 532-$i$. Therefore, elements in the receiver 531-$i$ having similar functions as in the receiver 532-$i$ will not be repetitively described herein for brevity and clarity.

Figure 5C:
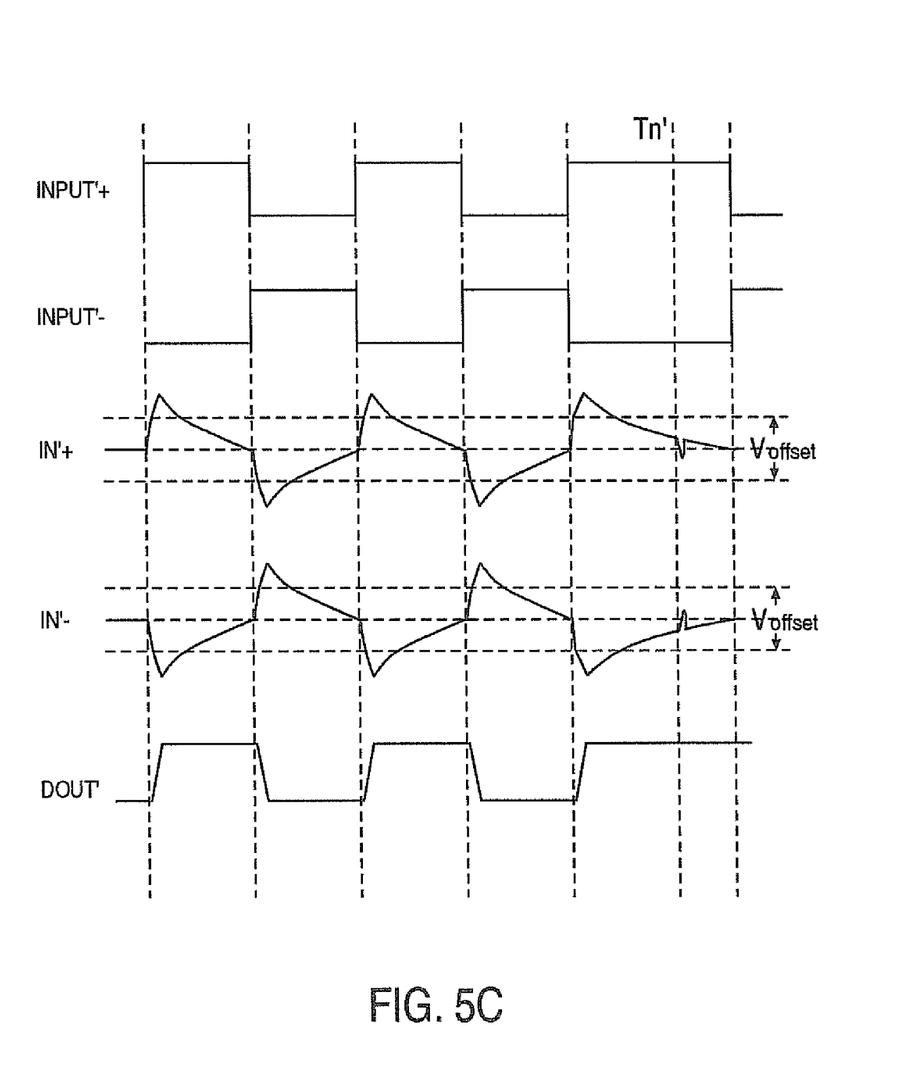
FIG. 5C shows an example of signals associated with a receiver in a vertical bus circuit, in accordance with one embodiment of the present invention.

FIG. 5C shows an example of signals associated with the receiver 531-$i$ in the vertical bus circuit 412-$i$ as shown in FIG. 5A. Signals INPUT'+ and INPUT'− represent the differential input data signals sent to the capacitors C6 and C7, respectively, from the upper battery management chip 410-($i$+1). Signals IN'+ and IN'− are signals received by the receiver 531-$i$ via the capacitors C6 and C7, respectively. Signal DOUT' is output by the NAND gate 552-$i$, and it represents the output of the receiver 531-$i$. In one embodiment, signal DOUT' is indicative of the positive differential data signal INPUT'+ received by the capacitor C6. As shown in the example of FIG. 5C, if there is noise existing at the pins INi+ and INi− at time Tn', then that noise can be canceled out in the output signal DOUT' if the difference of the differential signals IN'+ and IN'− is within the hysteresis area which is defined by the offset voltage $V_{offset}$.

Referring back to FIG. 5A, the output data signal of the receiver 531-$i$ is sent to the digital PLL 505-$i$. The digital PLL 505-$i$ synchronizes the received data signal with the clock in the battery management chip 410-$i$ and sends the synchronized data to the reply generator 507-$i$. In one embodiment, the reply generator 507-$i$ receives the synchronized data and transfers the synchronized data to the transmitter 534-$i$. In another embodiment, the reply generator 507-$i$ generates a reply in response to an instruction from the host processor 440 and sends the reply to the host processor 440 via the transmitter 534-$i$. The transmitter 534-$i$ includes multiple inverters 504-$i$, 506-$i$ and 508-$i$ as shown in the example of FIG. 5A. The inverters 504-$i$ and 506-$i$ can drive and output a positive differential signal, and the inverter 508-$i$ can drive and output a negative differential signal. As such, the transmitter 534-$i$ outputs a pair of differential output data signals indicative of the data received from the reply generator 507-$i$ to the vertical bus circuit 412-($i$−1) in the battery management chip 410-($i$−1) via the pins OUT($i$−1)'+ and OUT($i$−1)'−. However, if the battery management chip 410-$i$ is the bottom battery management chip 410-1, the transmitter 534-1 outputs the pair of differential output data signals via the pins OUT0'+ and OUT0'− to the converter 413. The converter 413 can convert the received pair of differential data signals into data which conforms to the first type of protocol, e.g., SPI bus protocol, and send the converted data to the host processor 440.

Advantageously, the receivers 531-$i$ and 532-$i$ as shown in the example of FIG. 5A have relatively low power consumption and simple circuitry. Moreover, noise that exists at the pins (e.g., pins IN($i$−1)'+, IN($i$−1)'−, IN+ and IN−) can be canceled out if the difference of the differential input signals of the receiver 532-$i$/531-$i$ is within the hysteresis area which is defined by the offset voltage $V_{offset}$.

In one embodiment, the alert logic 522-$i$ in the vertical bus circuit 412-$i$ can provide an alert signal to inform the host processor 440 the status of the corresponding battery management chip 410-$i$, for example, whether self-testing of the battery management chip 410-$i$ is completed, and to request service from the host processor 440. The alert signal is transferred to the modulator 523-$i$ for encoding. The encoded alert signal is sent to the vertical bus circuit 412-($i$−1) in the battery management chip 410-($i$−1) via the pin ALT($i$−1)'. In one embodiment, when the encoded alert signal is received by the receiver 521-($i$−1) in the vertical bus circuit 412-($i$−1), the receiver 521-($i$−1) transfers the received encoded alert signal to the alert logic 522-($i$−1). The alert logic 522-($i$−1) decodes the received encoded alert signal and sends the decoded alert signal to the modulator 523-($i$−1) for encoding. After encoding, a new encoded alert signal is sent to the vertical bus circuit 412-($i$−2) via the pin ALT($i$−2)' and further transferred to the host processor 440. In another embodiment, if the modulator 523-1 is in the bottom battery management chip 410-1, the modulator 523-1 can send the encoded alert signal to the converter 413 via the pin ALT0'. The converter 413 converts the received encoded alert signal that is communicated with the second type of protocol into data that can be communicated with the first type of protocol and that can be transferred to the host processor 440 via the pin IRQ.

Figure 6:
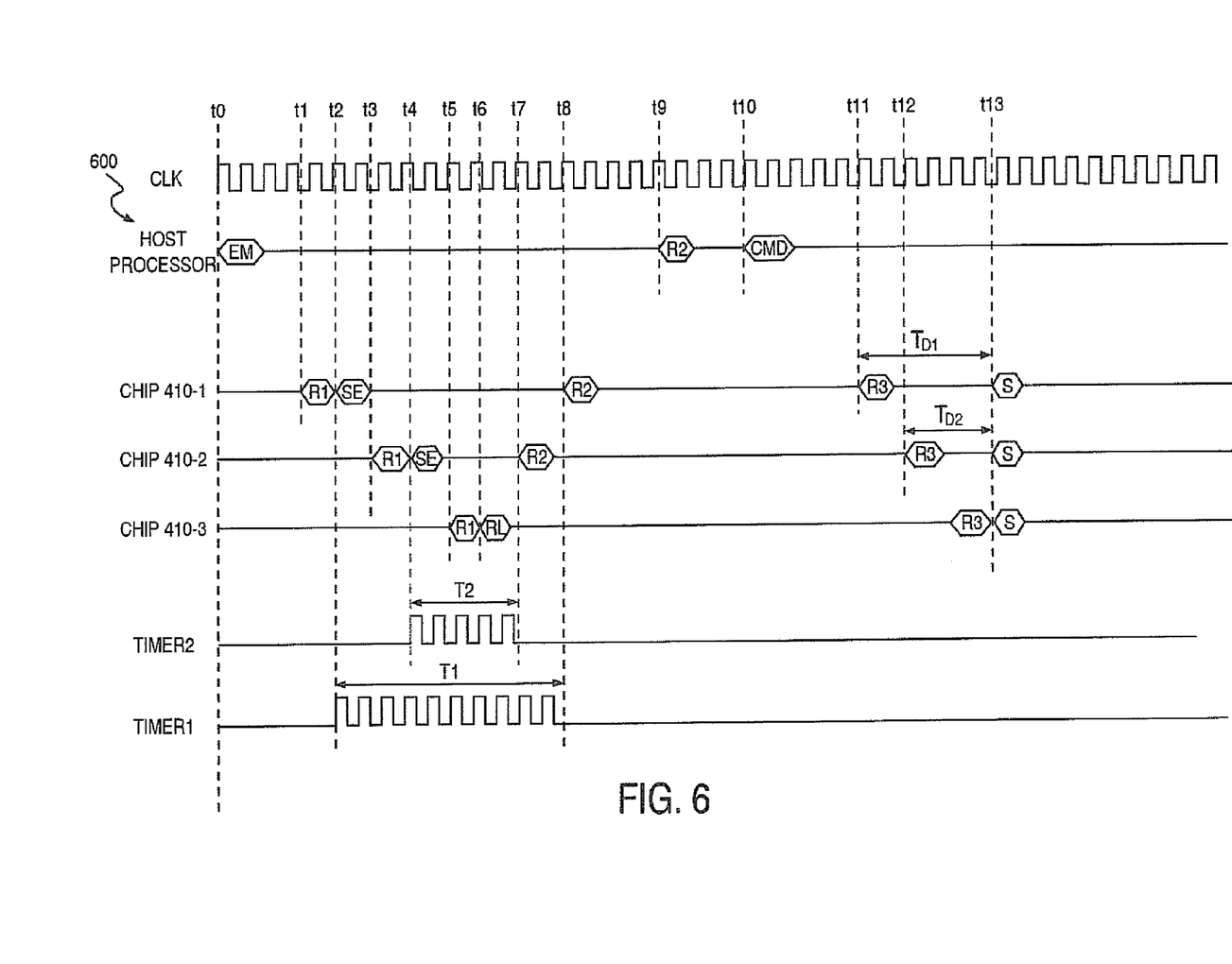
FIG. 6 shows a timing diagram of operations of a battery management system, in accordance with one embodiment of the present invention.

FIG. 6 shows a timing diagram 600 of operations of the battery management system 400 in FIG. 4, in accordance with one embodiment of the present invention. FIG. 6 is described in combination with FIG. 4. At t0, a command, e.g., an enumerate command, is sent by the host processor 440. The enumerate command is used to determine the total number of battery management chips coupled to the host processor 440 and allow each battery management chip to determine its own address. At t1, an enumerate packet, including the enumerate command, an initial chip number and checking data, is received by the vertical bus circuit 412-1 in the bottom battery management chip 410-1 via the converter 413. At time t2, the vertical bus circuit 412-1 in the battery management chip 410-1 generates an enumerate packet including the enumerate command, a new chip number generated by the enumerating circuit 416-1, and corresponding checking data, and sends the enumerate packet to the battery management chip 410-2. At time t3, the battery management chip 410-2 receives the enumerate packet sent by the battery management chip 410-1. At time t4, the battery management chip 410-2 generates an enumerate packet including the enumeration command, a new chip number generated by the enumerating circuit 416-2 and corresponding checking data, and sends that enumerate packet to the battery management chip 410-3. The battery management chip 410-3 receives the enumerate packet sent by the battery management chip 410-2 at time t5.

As shown in the example of FIG. 4, battery management chip 410-3 is the top chip. After the top battery management chip 410-3 receives the enumerate packet from the battery management chip 410-2, it sends a reply to the battery management chips 410-1, 410-2 and the host processor 440 at time t6. The reply can include the enumerate command and the chip number of the battery management chip 410-3, in one embodiment. The battery management chip 410-2 receives the reply at time t7, and further sends the reply to the battery management chip 410-1. At time t8, the battery management chip 410-1 receives the reply. At time t9, the host processor 440 receives the reply. Upon receiving the reply, the host processor 440 can determine the total number of battery management chips coupled to the host processor 440, based on the chip number of the top battery management chip.

Moreover, in one embodiment, at the time t2, when the battery management chip 410-1 sends an enumerate packet to the battery management chip 410-2, a timer TIMER1, e.g., in the battery management chip 410-1, starts to run until the battery management chip 410-1 receives the reply from the top battery management chip 410-3 at time t8. Thus, a time period T1 (T1=t8−t2) is calculated. At time t4, when the battery management chip 410-2 sends an enumerate packet to the battery management chip 410-3, a timer TIMER2, e.g., in the battery management chip 410-2, starts to run until the battery management chip 410-2 receives the reply from the battery management chip 410-3 at time t7. Thus, a time period T2 is calculated (T2=t7−t4).

The time periods T1 and T2 are used to compensate for the delays in communication between battery management chips, as follows. In one embodiment, the host processor 440 can send a broadcast command to the battery management chips to instruct the battery management chips to sample the status of each cell in the battery modules. For example, at time t10, a broadcast command, e.g., a sampling command for sampling cell voltages, is sent by the host processor 440 to instruct each battery management chip 410-$i$ to sample a cell voltage of each cell in the corresponding battery module 402-$i$. The battery management chip 410-1 receives the sampling command at time t11. A compensation timer, e.g., in the battery management chip 410-1, starts to run for a time period $T_{D1}$. In one embodiment, $T_{D1}$=T1/2. Thus, the battery management chip 410-1 samples the cell voltages of the cells in the battery module 402-1 at time t13, i.e., at a time delay $T_{D1}$ after time t11. Similarly, the battery management chip 410-2 receives the sampling command at time t12. A compensation timer, e.g., in the battery management chip 410-2, starts to run for a time period $T_{D2}$. In one embodiment, $T_{D2}$=T2/2. Thus, the battery management chip 410-2 also samples the cell voltages in the battery module 402-2 at time t13, i.e., at a time delay $T_{D2}$ after time t12. The top battery management chip 410-3 receives the sampling command and also samples the cell voltages in the battery module 402-3 at time t13. Advantageously, all the battery management chips 410-1-410-3 sample the cell statuses at the same time (t13).

Thus, by calculating the delay (e.g., T1 and T2 in the example of FIG. 6) between the time a battery management chip sends an enumerate packet and receives a reply during the enumeration process, corresponding time compensation parameters (e.g., $T_{D1}$ and $T_{D2}$ in the example of FIG. 6) can be obtained. Therefore, when receiving a broadcast command sent by the host processor 440, a battery management chip 410-$i$ may execute the command, e.g., sample the cell voltages, after compensating for the delay. Advantageously, each battery management chip 410-$i$ can therefore execute the broadcast command at the same time.

Figure 7:
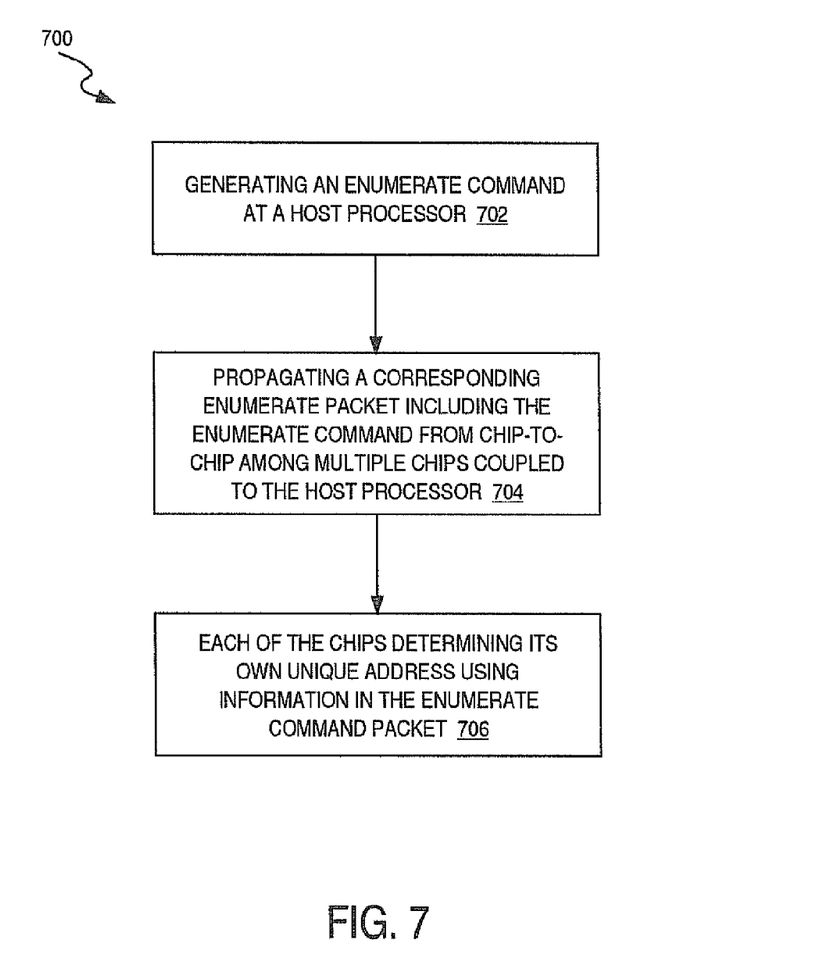
FIG. 7 shows a flowchart of operations performed by a battery management system, in accordance with one embodiment of the present invention.

FIG. 7 shows a flowchart 700 of operations performed by a battery management system, in accordance with one embodiment of the present invention. FIG. 7 is described in combination with FIG. 4. Although specific steps are disclosed in FIG. 7, such steps are exemplary. That is, the present invention is well suited to performing various other steps or variations of the steps recited in FIG. 7.

In block 702, a host processor, e.g., host processor 440 as shown in the example of FIG. 4, generates and sends an enumerate command to multiple chips, e.g., battery management chips 410-1-410-3, to determine the total number of battery management chips and to allow each battery management chip 410-$i$ to determine its own address.

In block 704, the battery management chips propagate a corresponding enumerate packet including the enumerate command from chip-to-chip. More specifically, a first enumerate packet can be generated by a converter 413. In one embodiment, the first enumerate packet can include the enumerate command, a first chip number and first checking data. The first checking data can be used to check an error in said first chip number. The first battery management chip 410-1 receives the first enumerate command, generates a second enumerate command packet including a second chip number and second checking data, and sends the second enumerate command packet to the upward battery management chip 410-2. The battery management chip 410-2 receives the second enumerate packet and generates a third enumerate packet including the enumerate command, a third chip number and third checking data, and sends the third enumerate packet to the upward battery management chip 410-3. As shown in the example of FIG. 4, battery management chip 410-3 is the top chip. Thus, the battery management chip 410-3 receives the third enumerate packet, but does not send a corresponding enumerate packet, in one embodiment.

In block 706, each chip determines its own unique address using information in the received enumerate packet. More specifically, in one embodiment, a chip number received by the corresponding battery management chip 410-*i* is used to represent the address of the battery management chip 410-*i*. In one such embodiment, as shown in the example of FIG. 4, the battery management chip 410-3 is the top chip. Therefore, the top battery management chip 410-3 does not generate a new chip number. However, in another embodiment, a chip number generated by the battery management chip 410-*i* can be used to represent its unique address, and thus the top battery management chip 410-3 generates a new chip number to represent the address of the battery management chip 410-3.

In one embodiment, the top battery management chip 410-3 can send a reply to the other battery management chips 410-1 and 410-2, and also to the host processor 440. The reply includes the enumerate command and the chip number of the battery management chip 410-3, in one embodiment. The chip number represents the address of the battery management chip 410-3. After the host processor 440 receives the reply, it can determine the total number of battery management chips coupled to the host processor 440, e.g., according to the chip number of the battery management chip 410-3.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A system comprising:
a plurality of chips; and
a host processor coupled to said plurality of chips and operable for sending an enumerate command, wherein said chips propagate an enumerate packet comprising said enumerate command from chip-to-chip and wherein each chip uses information in said enumerate packet to determine its own unique address.

2. The system of claim 1, wherein a first chip of said plurality of chips receives a first enumerate packet comprising said enumerate command, a first chip number and first checking data for checking for an error in said first chip number and sends a second enumerate packet comprising said enumerate command, a second chip number and second checking data for checking for an error in said second chip number to a second chip of said plurality of chips.

3. The system of claim 2, wherein said second chip receives said second packet and sends a reply to said first chip, and wherein said host processor also receives said reply and determines the total number of chips in said system according to said reply.

4. The system of claim 3, wherein said first chip is operable for calculating a first time delay between the time said first chip sends said second packet to said second chip and the time said first chip receives said reply.

5. The system of claim 4, wherein said host processor sends a broadcast command to said plurality of chips, wherein said first chip executes said broadcast command after a second time delay upon receiving said broadcast command, and wherein said second time delay is determined based on said first time delay.

6. The system of claim 5, wherein said second time delay is half of said first time delay.

7. The system of claim 2, wherein said first chip is operable for generating said second chip number according to said first chip number.

8. The system of claim 2, wherein said first chip is operable for generating said second checking data, and wherein said second checking data is an inversion of said second chip number.

9. The system of claim 2, wherein said first checking data is an inversion of said first chip number.

10. The system of claim 2, wherein said first chip number indicates an address of said first chip, and wherein said second chip number indicates an address of said second chip.

11. The system of claim 2, wherein said second chip number indicates an address of said first chip.

12. A battery management chip comprising:
a battery management unit operable for monitoring and sampling statuses of a plurality of cells in a battery module coupled to said battery management chip; and
an enumerating circuit coupled to said battery management unit and operable for receiving an enumerate packet,
wherein said enumerate packet comprises an enumerate command and a first number, and
wherein said enumerating circuit generates a second number based on said first number in response to said enumerate command.

13. The battery management chip of claim 12, wherein said enumerate packet further comprises first checking data for checking for an error in said first number.

14. The battery management chip of claim 13, wherein said enumerating circuit comprises:
a chip number generator operable for generating said second number; and
a checking circuit operable for checking for said error in said first number according to said first checking data, and also operable for generating second checking data for checking for an error in said second number,
wherein said checking circuit generates said second checking data based on said second number.

15. The battery management chip of claim 14, wherein said first checking data is an inversion of said first number, and said second checking data is an inversion of said second number.

16. The battery management chip of claim 14, wherein said enumerating circuit further comprises a multiplexer coupled to said chip number generator and said checking circuit, wherein said multiplexer provides said second number during a generating process and provides said second checking data during a checking process.

17. The battery management chip of claim 14, wherein said chip number generator comprises a first terminal to receive said first number, and wherein said chip number generator increases said first number by one to generate said second number.

18. The battery management chip of claim 14, wherein said checking circuit comprises a first terminal to receive said second number, and generates said second checking data based on said second number.

19. The battery management chip of claim 12, wherein said first number indicates an address of said battery management chip.

20. The battery management chip of claim 12, wherein said second number indicates an address of said battery management chip.

21. The battery management chip of claim 12, wherein said battery management unit receives an instruction from a host processor, and implements said instruction if an address in said instruction matches an address of said battery management chip.

22. A method, comprising:
generating an enumerate command at a host processor;
propagating a corresponding enumerate packet comprising said enumerate command from chip-to-chip among a plurality of chips coupled to said host processor; and
each of said chips determining its own unique address using information in said enumerate command packet.

23. The method of claim 22, further comprising:
receiving, at a first chip of said chips, a first enumerate packet comprising said enumerate command, a first chip number and first checking data for checking an error in said first chip number; and
sending, from said first chip to a second chip of said chips, a second enumerate packet comprising said enumerate command, said second chip number and second checking data for checking for an error in said second chip number.

24. The method of claim 23, further comprising:
receiving said second enumerate packet at said second chip; and
said second chip sending a reply to said chips and said host processor; and
said host processor determining the total number of chips according to said reply.

25. The method of claim 23, wherein said first chip number indicates an address of said first chip, and wherein said second chip number indicates an address of said second chip.

26. The method of claim 23, wherein said second chip number indicates an address of said first chip.

* * * * *